No. 641,374. Patented Jan. 16, 1900.
F. B. COOK.
COMBINED TERMINAL HEAD AND JUNCTION BOX.
(Application filed Feb. 26, 1898. Renewed Nov. 29, 1899.)

(No Model.) 2 Sheets—Sheet 1.

Witnesses:
J. B. Keir
Robert Weir

Inventor:
Frank B. Cook
By Chas. C. Buckley, Atty.

THE NORRIS PETERS CO., PHOTO-LITHO., WASHINGTON, D. C.

No. 641,374. Patented Jan. 16, 1900.
F. B. COOK.
COMBINED TERMINAL HEAD AND JUNCTION BOX.
(Application filed Feb. 26, 1898. Renewed Nov. 29, 1899.)
(No Model.) 2 Sheets—Sheet 2.
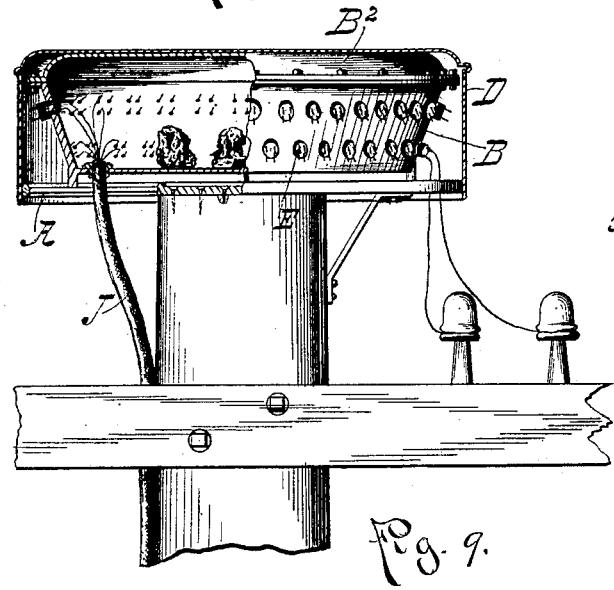
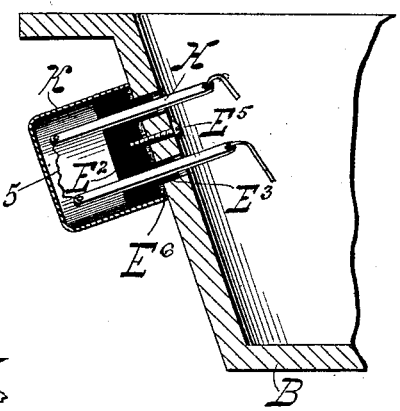
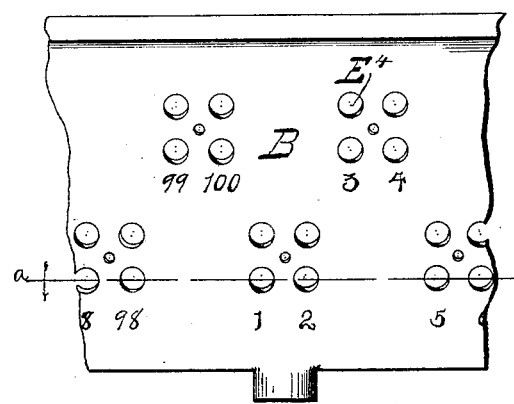
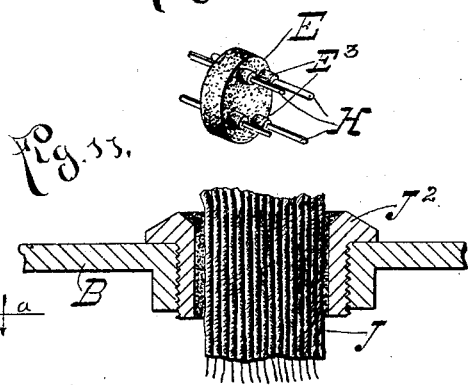
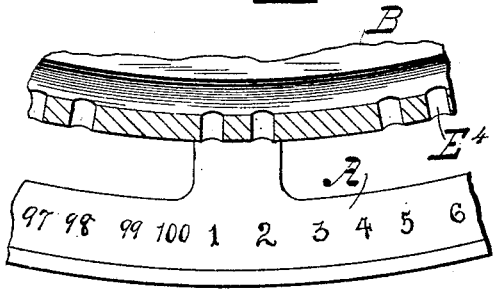
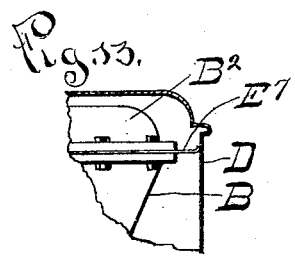
Witnesses:
J B Weir
Robert Weir
Inventor.
Frank B. Cook,
by Chas. C. Bulkley, Atty.
THE NORRIS PETERS CO., PHOTO-LITHO., WASHINGTON, D. C.

UNITED STATES PATENT OFFICE.

FRANK B. COOK, OF CHICAGO, ILLINOIS.

COMBINED TERMINAL HEAD AND JUNCTION-BOX.

SPECIFICATION forming part of Letters Patent No. 641,374, dated January 16, 1900.

Application filed February 26, 1898. Renewed November 29, 1899. Serial No. 738,726. (No model.)

*To all whom it may concern:*

Be it known that I, FRANK B. COOK, a citizen of the United States, residing at Chicago, in the county of Cook and State of Illinois, have invented a certain new and useful Improvement in a Combined Terminal Head and Junction-Box, of which the following is a specification.

In the aerial or underground construction of telephone-lines emanating from a central exchange it is usual to provide apparatus for receiving the terminals of the lines and for providing means of connecting lines at this apparatus. It is usual to provide a cable or cables emanating from the central exchange in which several telephone-lines are inclosed, which cable is extended to a point from which it is desired to distribute or terminate the several grouped lines. At the point where the lines are to be distributed or terminated apparatus is provided for protecting and shielding the exposed lines.

My invention relates to an improved combined terminal and junction-box, and has for its object the provision of such a construction and character as is adapted to inclose and protect the terminals and junctions of the lines against climatic attacks, provide ready means of identifying the lines, and also providing means whereby convenient connections may be made to effect that multiple distribution desirable in telephone systems.

My invention consists in certain features and has certain other objects in view about to be described, set forth, and pointed out in my claims, reference being now had to the accompanying drawings, in which—

Figure 1:
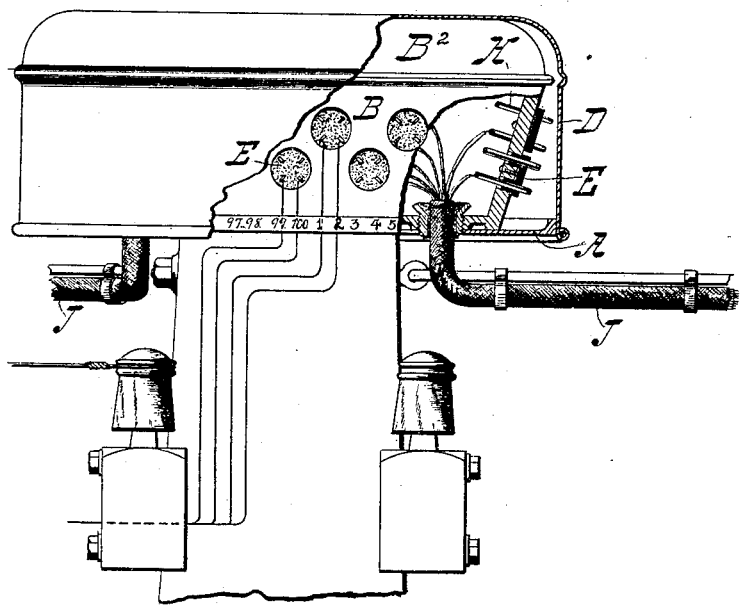
Figure 2:
Figure 3:
Figure 4:
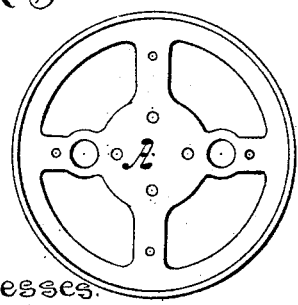
Figure 5:
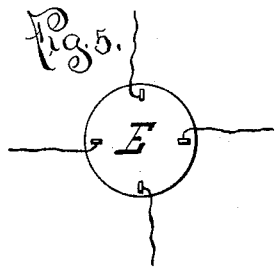
Figure 6:
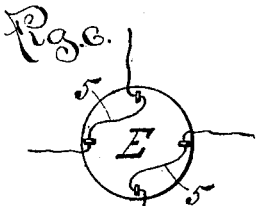

Figure 1 is a side view of an aerial pole-top terminal and junction-box, shown partly broken away to disclose the interior. Fig. 2 is a diagrammatic view illustrating a multiple distribution of circuit-lines emanating from a cable. Fig. 3 is a like view of a complete metallic-circuit distribution. Fig. 4 is a detail plan view of the base-spider. Fig. 5 is a detail end view of one of the holding-heads, showing the lines extended from each one of the conductor-arms. Fig. 6 is a like view showing the arms connected in pairs by bridal-wires. Fig. 7 is a view similar to Fig. 1 from the opposite side of the apparatus, which slightly differs in construction, also showing the outer cover completely in section and the inner containing-shell partly broken away. Fig. 8 is a section through a portion of the containing-shell, showing one of the holding-heads in position. Fig. 9 is an enlarged side view of a portion of the inner containing-shell. Fig. 10 is a detail enlarged perspective view of one of the holding-heads. Fig. 11 is a sectional view through one of the cable-bushings. Fig. 12 is a section on the line $a\ a$ of Fig. 8, showing the containing-shell resting upon the base-spider. Fig. 13 is a detail view of a portion of the containing-shell, showing the gasket between the shell and its cover supporting the outer cover.

In carrying out my invention I provide a suitable annular base plate or spider A, which is secured upon a pole top or in any suitable position. Upon this spider A is placed an annular dish-shaped containing-shell B, secured in place by suitable means. The top of the shell B is sealed or closed by a cover $B^2$. An outer protecting-cover D is placed over the containing-shell B and its cover $B^2$.

The holding-heads E comprise the base $E^2$, of insulating material, having the projecting studs $E^3$, also of insulating material, and these studs are adapted for insertion in the apertures $E^4$, arranged in the annular inclined side of the containing-shell B. Extended through the studs and base are the conducting arms or rods H, to the ends of which the circuit-wires may be secured. These arms H are molded into the bases.

To adjust and secure the holding-heads, with their conducting-rods, in position, the studs $E^3$ are inserted in the apertures $E^4$ and a central screw $E^5$ extended through the side of the containing-shell B into the base $E^2$. By this means the holding-heads E are securely held in place. A soft-rubber gasket $E^6$ is disposed between the base $E^2$ and the side of the containing-shell. A rubber gasket $E^7$ is disposed between the cover $B^2$ and the shell B, which is extended annularly to frictionally engage and bear upon the outer cover D and hold it in an elevated position, as shown in Fig. 13, and by this means giving access to the interior within, necessitating a complete removal of the said cover.

To absorb the moisture within the interior of the apparatus, I place quantities of lime within the containing-shell B, as shown in Fig. 7.

The cables J are extended through the bottom plate of the containing-shell B into the interior thereof and the wires in said cable distributed and connected to the inner ends of certain designated or determined conducting-rods H. In Fig. 11 is shown a cable passing through a thimble J², screwed into an orifice in the bottom of the containing-shell B, the cable being fastened in the thimble by a mass of solder.

In Fig. 8 I have shown a protecting-cap K to inclose the holding-head E, which may be used for additional protection, if deemed necessary.

The telephone-lines are led from the cable J and distributed and connected to the inner ends of the conducting-rods H within the interior of the containing-shell B, and the connection is therefore within a receptacle which protects against weather attacks. The lines may terminate at the point of connection with the conducting-rods, or the circuit may be continued by connection of the lines to the other ends of the conducting-arms. In this construction provision is made for a multiplication of connections, as illustrated in Figs. 2, 3, 5, and 6. In Fig. 2, for instance, lines are shown emanating from a cable and connected to the conducting-rods H and also connected with other lines emanating from another cable at and by said conducting-rods. In Fig. 3 a pair of metallic circuit-lines are connected to a pair of conducting-rods H and this pair connected by the bridal-wires 5 5, Fig. 6, with another pair of circuit-lines extending into another cable. In Fig. 5 individual lines are shown connected to the ends of the rods H. By means of this arrangement it becomes possible to make all sorts of different combinations and effect a multiple distribution of the lines at and within an inclosed receptacle and also to terminate the lines therein.

The lines may be identified by suitable numbers arranged in proper relative positions.

The protecting-cap K may be used in such cases as illustrated in Figs. 3 and 6, where the outer ends of the conducting-rods H are connected together by bridal-wires and not connected to wires which extend outward from said rods.

It is of course apparent that my invention may be used as a junction-box or terminal head as well as a combined junction-box and terminal head.

Having thus described my invention, what I claim as new therein, and desire to secure by Letters Patent, is—

1. In a combined terminal and junction-box, a containing-shell, a cover therefor, a plurality of holding-heads in the said containing-shell, and conducting arms or rods in said holding-heads together with an outer cover disposed over said containing-shell and holding-heads.

2. In a combined terminal and junction-box an inner containing-shell a cover therefor, holding-heads held in the side of said shell, a cap for each of said holding-heads and a cover for the whole.

3. Holding-heads comprising in construction an insulating-base and conducting arms or rods extended therethrough.

4. Holding-heads comprising in construction an insulating-base, studs therefor of insulating material and conducting arms or rods extended through the studs and base.

5. In a combined terminal and junction-box, a containing-shell, a cover therefor, a plurality of holding-heads in said containing-shell, conductor rods or arms in said holding-heads, a base-plate upon which the containing-shell may rest and an outer cover disposed over said containing-shell and holding-heads.

In testimony whereof I affix my signature in presence of two witnesses.

FRANK B. COOK.

Witnesses:
CHAS. C. BULKLEY,
L. M. BULKLEY.